United States Patent [19]

Hardison

[11] Patent Number: 4,539,110
[45] Date of Patent: Sep. 3, 1985

[54] LIQUID AERATOR

[76] Inventor: John C. Hardison, 2500 W. Skelley, Tulsa, Okla. 74107

[21] Appl. No.: 519,983

[22] Filed: Aug. 3, 1983

[51] Int. Cl.³ .............................................. B01F 3/04
[52] U.S. Cl. .................................... 210/150; 210/219; 261/92; 366/317
[58] Field of Search ............... 210/150, 151, 161, 319, 210/332, 408, 497.01, 219, 619, 620; 261/92; 366/317, 330; 416/235, 236 R; 239/224

[56] References Cited

U.S. PATENT DOCUMENTS

| 3,744,774 | 7/1973 | Huisman et al. | 239/224 X |
| 4,345,997 | 8/1982 | McConnell, Jr. et al. | 210/150 |
| 4,372,895 | 2/1983 | Saffran | 210/150 X |
| 4,399,031 | 8/1983 | Imano et al. | 210/150 |

Primary Examiner—Richard V. Fisher
Assistant Examiner—W. Gary Jones
Attorney, Agent, or Firm—Schmidt, Johnson, Hovey & Williams

[57] ABSTRACT

An improved, self-cleaning, bidirectionally shiftable liquid contacting device is provided which serves to give enhanced aeration and mixing of liquids such as sewage water at a relatively low cost in terms of horsepower input. The device preferably includes a rotatable, flat, annular plate provided with oppositely projecting, circumferentially spaced, radially oriented rows of liquid-contacting elements strategically located and configured for maximum effectiveness. Each element is in the form of a flat-topped, solid body presenting a pair of elongated, opposed, inclined, converging, concave faces, with the axes of the respective concavities being transverse relative to one another. As the plate is rotated, the leading concave face gives excellent mixing and lateral liquid diversion, whereas at the trailing concave face, a suction action serves to draw air deeply into the liquid for subsequent release and aeration. The elements in each individual row (which can be individual and spaced apart or in the form of a bar-like integral member) are advantageously radially offset relative to elements in adjacent rows, so that air bubbles formed in trailing surface concavities are effectively stripped from the face of the rotatable plate, thereby further enhancing the overall aeration effect.

11 Claims, 12 Drawing Figures

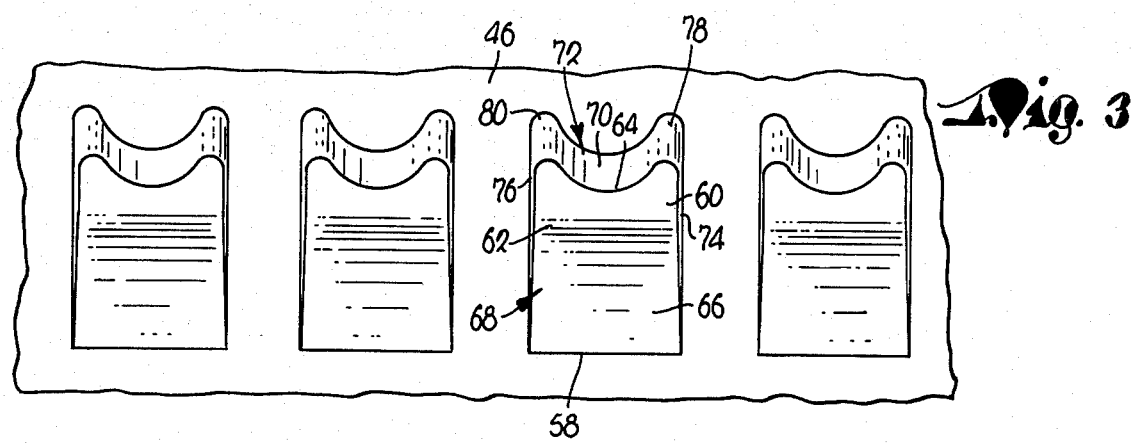
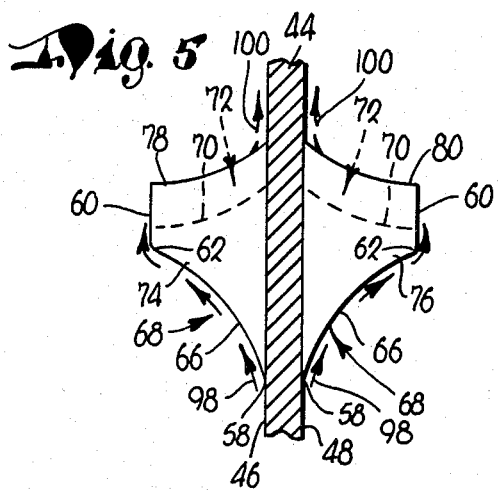
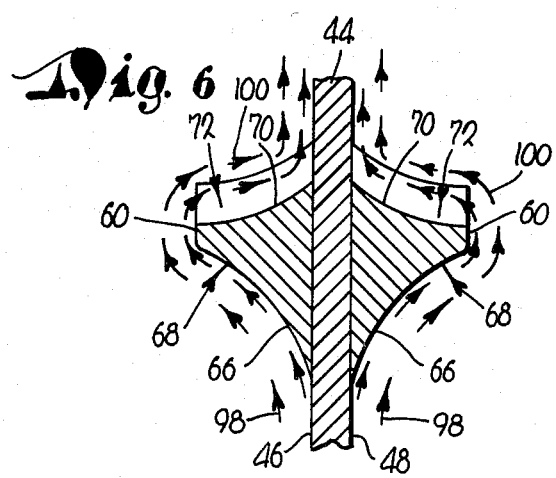
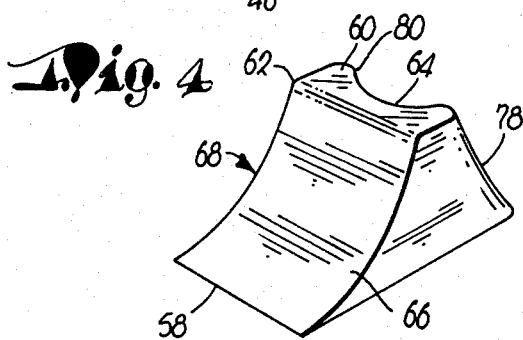
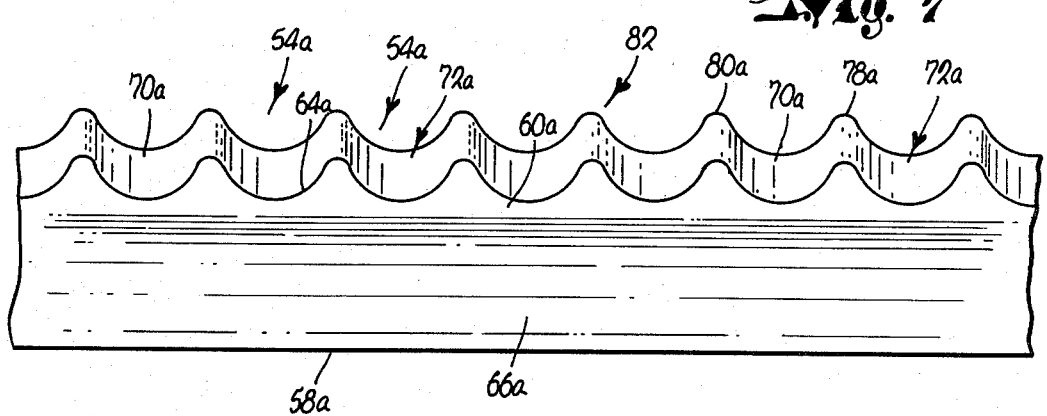

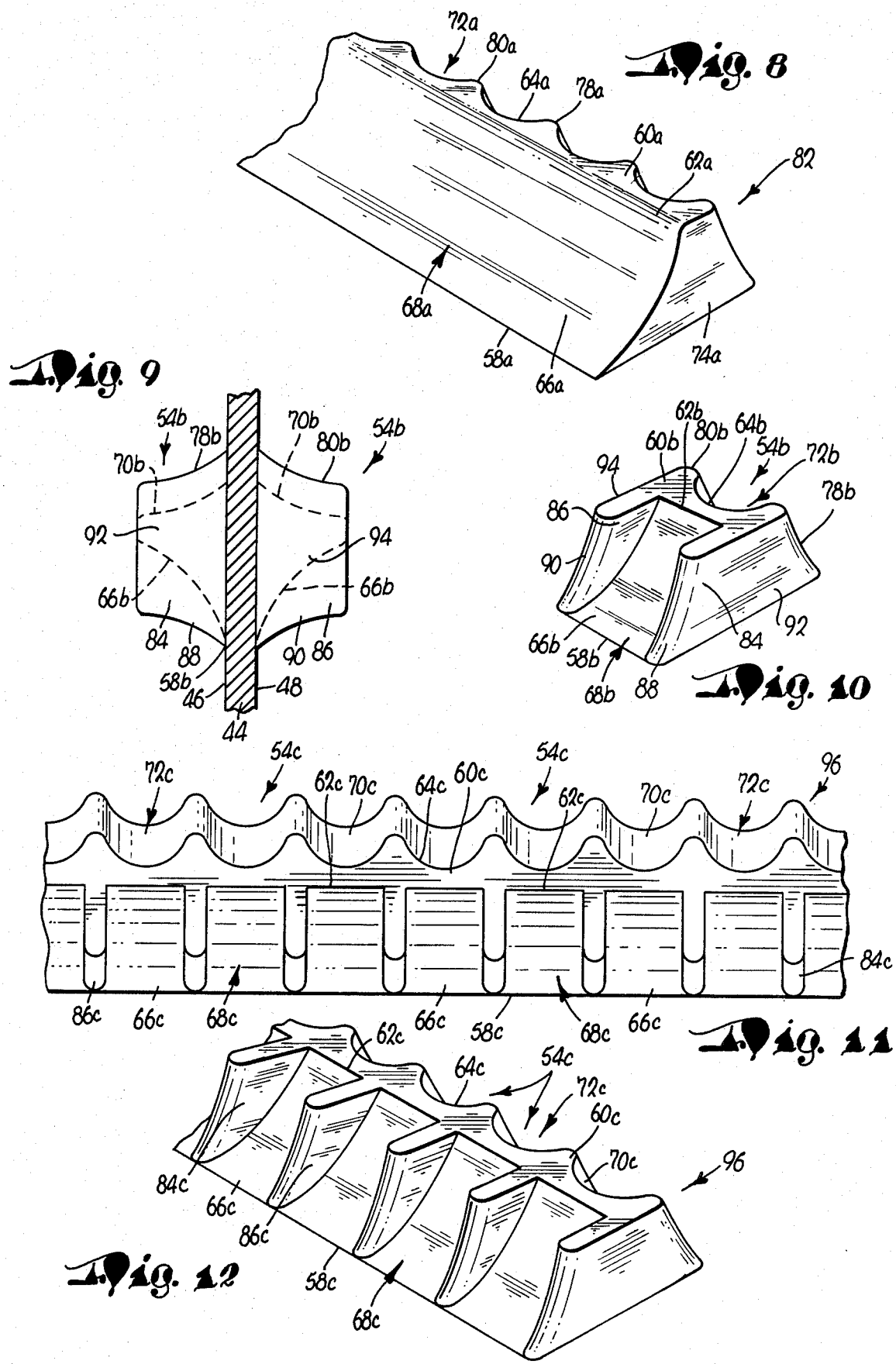

LIQUID AERATOR

BACKGROUND OF THE INVENTION

1. Field of the Invention

The present invention is broadly concerned with a greatly improved rotatable liquid-contacting device which can be used to give both aeration and liquid mixing, and, depending upon the direction of rotation thereof, the device can be used primarily as a mixing unit, or, alternately, as an aerator. More particularly, it is concerned with such an aeration and mixing device which includes a flat, annular, rotatable plate provided with a plurality of radial, circumferentially spaced apart, outwardly projecting liquid-contacting elements which are especially designed and include leading and trailing faces presenting concavities.

2. Description of the Prior Art

One type of sewage treatment system presently in use includes a multiple-channel basin which is generally in the form of a plurality of circular or oval concentric channels and is designed for receiving raw, incoming sewage. A number of partially submerged spaced apart, specially designed aeration disks rotate in each channel in order to give enhanced mixing and aeration of the raw sewage. In such a system, the raw waste, after screening and grit removal, is fed directly into the first channel where it is dispersed in mixed liquor. The rotating aeration disks serve to mix and aerate the liquor and keep it moving in the channel. The mixed liquor makes a number of circuits of the channel depending upon the retention time required. A portion of the mixed liquor, approximately equal to the incoming and recirculated flow, is fed into succeeding channels through submerged transfer ports. After passing through the final inboard channel, the mixed liquor flows into a clarifier for final treatment.

In order to achieve optimum mixing and aeration of liquid sewage in a system of the type described, it is important that the rotating aeration disks be properly designed. For example, such disks normally include oppositely projecting elements on the opposed faces of the aeration disks which are designed to enhance both aeration and mixing. However, it will be readily seen that improperly designed liquid-contacting elements on the disks create undue resistance while not measurably enhancing aeration or mixing, with the result that increased horsepower demands are placed on the system, thereby increasing costs.

U.S. Pat. No. 3,744,774 is directed to a liquid aerating device in the form of a rotatable disk including protruding liquid-contacting formations on the opposed faces thereof. The liquid-contacting elements in this instance are basically pyramidal in shape, and include a sharp leading apex with a pair of diverging, flat faces terminating in a flattened, rearmost trailing face. It is believed that liquid-contacting elements of the type described in U.S. Pat. No. 3,744,774 are deficient in a number of important respects, including the aeration efficiency thereof and the degree of mixing obtainable when using the same. Accordingly, there is a real and heretofore unsatisfied need in the art for an improved disk-type aeration device which satisfies the competing demands of low horsepower requirements coupled with maximum aeration and mixing.

SUMMARY OF THE INVENTION

The above problems are in large measure solved by the present invention which provides a greatly improved liquid contacting device usable for aeration and/or mixing of a wide variety of liquids including sewage water. Broadly speaking, the device of the invention comprises a rotatable, generally flat plate presenting a planar face, with a plurality of liquid-contacting elements affixed to and projecting from the plate face. Each of the elements includes structure defining an inboard first margin adjacent the plate face and preferably in the form of an elongated, rectilinear edge, and an outboard, second margin spaced outwardly from the plate face and offset from the first margin. An elongated first surface extends between the first and second element margins and lies at an acute angle relative to the plane of the plate face. Similarly, a second surface extends between the second margin and the plate face and likewise lies at an acute angle relative to the plane of the plate face. The first and second surfaces diverge with respect to each other as they extend toward the plate face, and at least one of the first and second surfaces is configured to present a concave air entrapment region therein.

In particularly preferred forms, both the first and second surfaces present concavities therein, with the concavity of the first surface extending laterally thereacross such that the longitudinal axis thereof is in general parallelism with the plate face; on the other hand, the concavity forming a part of the second surface extends along the length of the latter and is arcuate in cross section, thereby presenting an upright longitudinal axis intersecting the plate face. In this fashion, the longitudinal axes of the respective concavities are transverse with respect to each other.

In other preferred forms of the invention, the plurality of elements are arranged in respective, circumferentially spaced, generally radially extending rows on the plate face, with the elements in each row being radially offset relative to the elements in the next adjacent row thereof. In this fashion, stripping of air bubbles from the plate face is facilitated during rotation of the contact device. The respective elements may be individual and laterally spaced along the rows thereof, or in other forms of the invention the elements may be integrally joined together to present an elongated, multiple-element bar-like member. Moreover, the plate is normally provided with elements on both opposed faces thereof, with the respective element rows being in alignment.

The liquid contacting device of the invention is bidirectionally shiftable, and the inclined first and second faces are advantageously oriented so that, in one rotational direction aeration of the liquid is maximized, whereas in the other rotational direction, liquid mixing is the predominant action.

BRIEF DESCRIPTION OF THE DRAWINGS

FIG. 3 is an enlarged, fragmentary view illustrating four laterally spaced apart liquid-contacting elements affixed to a plate face;

FIG. 4 is a perspective view of one of the liquid contacting elements illustrated in FIG. 3;

FIG. 5 is a sectional view illustrating a pair of oppositely outwardly projecting, aligned liquid-contacting elements affixed to the opposed faces of a rotatable plate, and with arrows applied to the drawing to illustrate the flow of water therepast when the plate is rotated in one direction;

FIG. 6 is a view similar to that of FIG. 5 but illustrates in more detail the constructional aspects of the projecting elements and the action of flowing liquid during rotation of the plate;

FIG. 7 is a plan view illustrating a portion of an integral, multiple-element bar-like member usable in the invention in lieu of a plurality of spaced apart, individual liquid-contacting elements;

FIG. 8 is a perspective view of the bar-like member depicted in FIG. 7;

FIG. 9 is a sectional view similar to that of FIG. 5 but illustrates another type of liquid-contacting element in accordance with the invention, the latter being provided with a pair of spaced, upright projections respectively located on either side of the first element surface and extending along the length thereof, such that the overall liquid-contacting element has a somewhat H-shaped configuration in plan;

FIG. 10 is a perspective view of one of the H-shaped liquid contacting elements depicted in FIG. 9;

FIG. 11 is a fragmentary top view of an integral, multiple-element bar-like member wherein each of the respective elements are of generally H-shaped configuration in plan; and FIG. 12 is a fragmentary perspective view of the bar-like member illustrated in FIG. 11.

DESCRIPTION OF THE PREFERRED EMBODIMENTS

Figure 1:
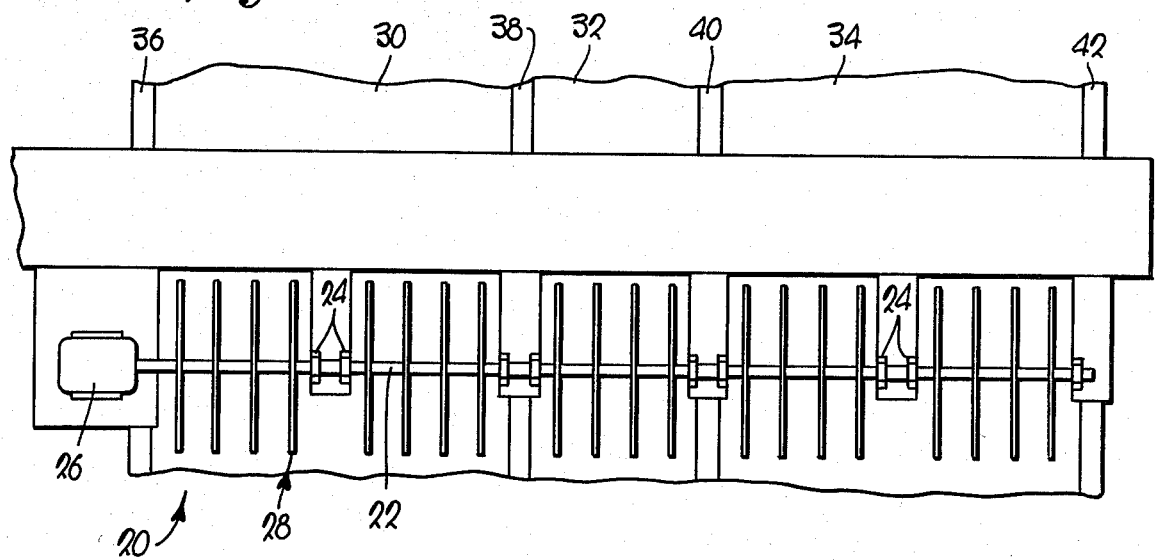
FIG. 1 is a somewhat schematic plan view illustrating a plurality of rotatable liquid contacting devices of the invention arranged in a lateral row across a multiple-channel sewage treatment basin and coupled with motive means for rotation thereof.

Turning now to the drawings, and particularly FIG. 1, liquid contacting apparatus 20 in accordance with the invention is illustrated. The overall apparatus 20 includes an elongated shaft 22 mounted on appropriate bearing supports 24 and powered for rotation by a motor 26. A plurality of flat, planar, annular liquid-contacting devices 28 are mounted in spaced apart relationship along the length of shaft 22 as illustrated. The overall apparatus 20 is mounted above a multiple-channel sewage treatment plant including a plurality of side-by-side liquid channels 30, 32 and 34, the latter being separated by upright sidewalls 36-42. The apparatus 20 is oriented so that the respective annular devices 20 are partially immersed within the liquid flowing through the channels 30-32. In operation, incoming raw sewage is fed into the multiple channel treatment basin, and the respective devices 28 are rotated through the medium of motor 26 and shaft 22, so as to effect aeration and mixing of the liquid, which is important for treatment thereof.

Each device 28 includes a flat, annular plate 44 presenting a pair of opposed, substantially planar faces 46, 48. The plate 44 is mounted for rotation on shaft 22 (see FIG. 2) by means of four inwardly projecting struts 50 secured to plate 44 and cooperatively defining an annular locking collar 52 which is affixed to shaft 22.

Figure 2:
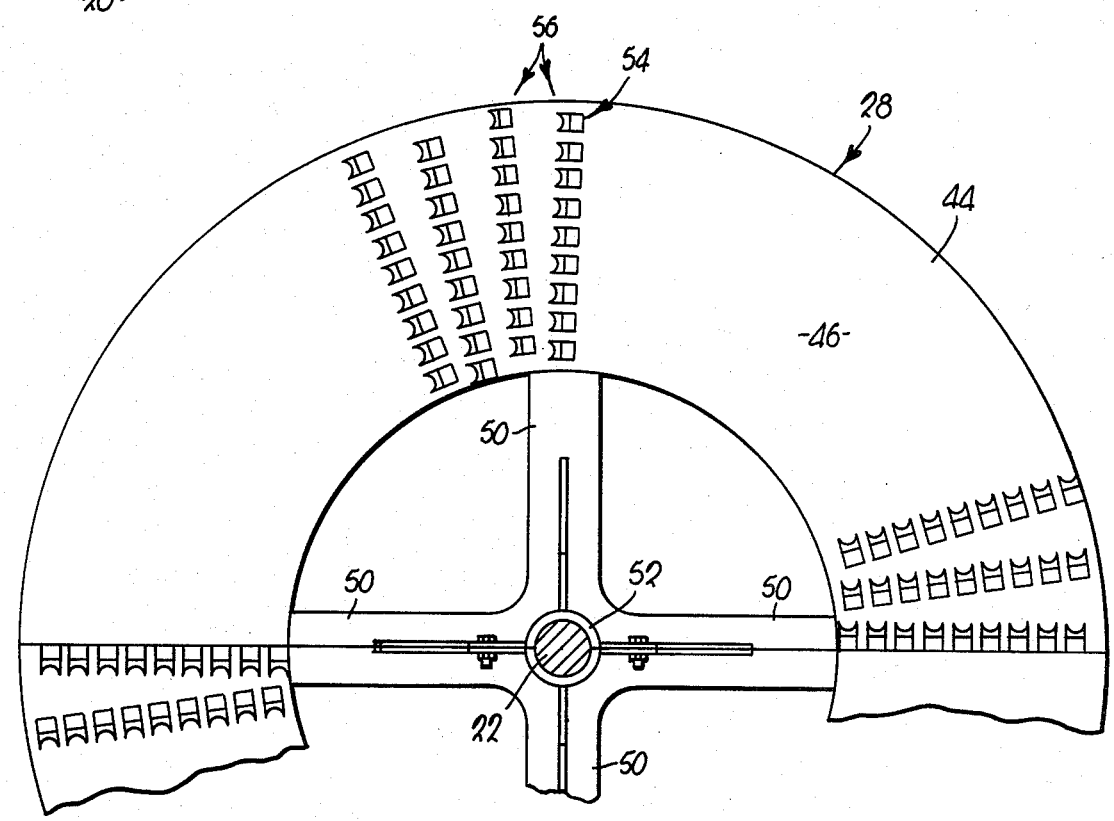
FIG. 2 is a fragmentary side view illustrating a liquid contacting device in accordance with the invention.

Each device 28 also includes a plurality of liquid-contacting elements 54 affixed to and projecting outwardly from each plate face 46, 48. As illustrated in FIG. 2, the elements 54 are arranged in respective, circumferentially spaced, generally radially extending rows 56, with the individual elements 54 in each row 56 being radially spaced apart. Moreover, the elements 54 in each row are radially offset relative to the elements in the next adjacent row thereof, advantageously a distance of approximately one-half of an element width. The purpose of this offset orientation will be explained hereinafter.

Referring now to FIGS. 2-6, the constructional features of the preferred elements 54 will be explained in greater detail. First, it will be understood that each element 54 is advantageously of solid form, and may be fabricated from any convenient metal or synthetic resin material. In addition however, it will be seen that each of the elements include structure defining an inboard first margin 58 adjacent the associated plate face and preferably in the form of an elongated, substantially rectilinear edge extending the full width of the element. An outboard second margin 60 is spaced outwardly from the adjacent plate face and is offset relative to first margin 58. The second margin 60 is in the form of a flat, uppermost wall, presenting a substantially straight, transversely extending edge 62 parallel with first margin 58, and an arcuate second edge 64.

An elongated first surface 66 extends between the first and second margin 58, 60 (and particularly the edge 62 of the latter), and lies at an acute angle relative to the plane of the adjacent plate face. As best seen in FIG. 4, the surface 66 extends the full width of the element and is arcuate so as to present a concave region 68 extending laterally across the first surface 66. In this manner, the concavity 68 presents a longitudinal axis which is in general parallelism with the adjacent planar plate face.

A second elongated surface 70 extends between the arcuate edge 64 of margin 60 and the adjacent plate face and likewise lies at an acuate angle relative to the plane of the plate face, although the angle of inclination of surface 70 is greater than that of surface 66. Advantageously, surface 70 should be oriented at an angle of from about 45 to 85 degrees, whereas surface 66 should be located at an angle of from about 25 to 65 degrees, both taken with respect to the adjacent planar plate face.

It will also be seen that second surface 70 includes an elongated concave region 72 extending along the full length thereof which is arcuate in cross section and generally conforms to arcuate edge 64. In this fashion, the region 72 presents a longitudinal axis which intersects the adjacent plate face, and which is upright and transverse relative to the longitudinal axis of arcuate region 68 of first surface 66.

The overall element 54 further includes a pair of sidewalls 74, 76 which are generally of triangular shape and upright orientation. As best seen in FIGS. 3 and 4, the sidewalls 74, 76, extend from the side margins of the surface 66 and terminate in respective, rounded, arcuate shoulder regions 78, 80, the latter being upright and merging smoothly with elongated arcuate in cross section second surface 70.

Turning now to FIGS. 7-8, a multiple-element bar-like member 82 is illustrated. The member 82 is of integral construction and is configured to present a plurality of side-by-side element areas 54a. Inasmuch as the areas 54a are essentially identical in constructional features to the individual contacting elements 54, like reference numerals, with the addition of a designating letter "a", have been employed in FIGS. 7-8. Thus, the member 82 includes an elongated edge margin 58a, a flat topped wall second margin 60a, a first transversely arcuate, laterally extending surface 66a and a second arcuate surface 70a for each area 54a. Likewise, the other structural features of the individual elements 54 find correspondence in the respective areas 54a of member 82.

Another embodiment of the invention is illustrated in FIGS. 9–10. Specifically, in this instance an element 54b is provided which is similar in most respects to the previously described element 54, and thus the identical features will not be again discussed (but like features bear similar reference numerals with an appended "b" designation). However, it will be seen that the elements 54b includes a pair of upright projections 84, 86 respectively disposed on either side of the first surface 66b with the effect that the latter surface is recessed. It will be noted that the projections 84, 86, terminate in rounded arcuate shoulders 88, 90, and that the outermost periphery of such shoulders is oriented at an acute angle relative to the base of the element 54b. Also, it will be seen that the element 54b presents a pair of generally trapezoidal sidewalls 92, 94 which extend between the respective shoulders 88, 90 and the associated shoulders 78b, 80b; in addition, it will be observed that the entire body 54 is essentially flat-topped, and that, by virtue of the upright projections 84, 86, the overall element 54b assumes a somewhat H-shaped configuration in plan.

The final embodiment of the invention is illustrated in FIGS. 11–12. In this instance, a bar-like member 96 is provided which in effect includes a plurality of integrated, side-by-side elements essentially identical to that illustrated in FIGS. 9–10. Accordingly, it will be seen that the member 96 includes a plurality of element areas 54c each including a first margin 58c, a second margin 60c, a first elongated surface 66c, a second elongated surface 70c, and a pair of upright projections 84c, 86c. As is apparent from the drawing, each of the element areas 54c includes the other structural features of the individual elements 54b as well; moreover, it will be appreciated that, inasmuch as the bar-like member 96 is of integral construction, each projection 84c or 86c (save for the endmost projections) separates a pair of juxtaposed surfaces 66c.

As noted above, the elements in accordance with the invention, be they either in individual or integrated form, are mounted on the surface of a rotatable plate such as plate 44 illustrated in FIG. 2. A plurality of such plates are then mounted for powered rotation as schematically depicted in FIG. 1. During operation of a device in accordance with the invention, the user can elect to rotate the plate 44 in either a clockwise or a counterclockwise direction. Referring specifically to FIG. 2, it will first be assumed that the plate is rotated in a clockwise direction. During this operational mode, each edge 58 and surface 66 is the leading edge, whereas the associated concave surface 64 is the trailing edge. In any event, during powered rotation of the plate 44 in the clockwise direction, the arcuate leading surfaces 66 of the respective elements 54 serve to push or "plow" water away from the associated planar plate faces 46 or 48, such action being depicted by the arrows 98 in FIGS. 5 and 6. However, as the trailing surfaces 70 of the bodies 54 enter the water, a suction action is created whereby air bubbles are drawn deeply into the liquid prior to entrance or back flush of water into the concavities 72, the latter action being illustrated by arrows 100 of FIGS. 5 and 6. This has the effect of drawing the air bubbles deeper into the liquid than with previous aerator devices of this type, so that more intense aeration results. After the bubbles are formed in the liquid at the region of the respective concavities 72, the centrifugal action created by the rotation of the plate 44 assists in moving the air bubbles from the concavities and along the planar surface of the element toward the liquid surface. During such movement, the ascending bubbles encounter the trailing elements in the next adjacent row thereof, and particularly the broad, relatively sharp edges 58 and the associated elongated surfaces 66. This has the effect of stripping the bubbles from the surface of the plate, which further facilitates the desired aeration effect. In preferred forms of the invention, the trailing elements are offset about one-half the width of an element (see FIG. 2), and this has been found to accommodate the centrifugal movement of the bubbles and provide the most efficient stripping effect.

It will also be appreciated that clockwise rotation of the plate 44 as viewed in FIG. 2 maximizes the aeration effect obtainable with the invention. On the other hand though, when it is desired to achieve high performance mixing, the plate 44 can be rotated in a counterclockwise direction. In this event, the surface 72 becomes the leading liquid-contacting face, whereas the surface 66 is the trailing surface. In this operational mode, the relatively blunt leading faces of the elements serve to give maximum mixing. Of course, a degree of aeration is nevertheless obtained in this event, but the primary action obtained by virtue of counterclockwise rotation is that of mixing.

If desired, use can be made of bar-like members 82 in lieu of all or some of the rows of individual elements 54. When such bar-like members are employed, the general effect is the same (i.e., high performance aeration in the clockwise direction wherein the edge 58a is the leading edge, or alternately high performance mixing wherein the surfaces 70a are the leading surfaces); however, because of the lack of spacing between elements these two effects may be somewhat enhanced. This enhanced mixing and/or aeration is counterbalanced, however, by virtue of the fact that somewhat greater horsepower inputs would normally be required when using the integral bar-like members 82.

If desired, the generally H-shaped elements 54b, or alternately the integral bar-like members 96, can be used in place of the elements 54a or bar-like members 82. In such event, rotation in the clockwise direction wherein the margins 58b or 58c are the leading margins gives an enhanced mixing effect. That is to say, provision of the upright projections 84, 86 or 84c, 86c gives an even greater mixing effect coupled with high performance aeration.

Finally, it will be recognized that by virtue of the rounded arcuate shoulders provided in all of the described elements or bar-like members, and the complete lack of any sharp projecting upright surfaces, the contacting devices of the present invention are essentially self-cleaning. Specifically, liquids such as raw sewage contain many solids or other refuse which can quite easily foul treatment equipment. However, the present invention is specifically designed to avoid or at least substantially minimize this problem through use of smoothly rounded upright edges and surfaces.

I claim:
1. A liquid contacting device, comprising:
 a rotatable plate presenting a generally planar face; and a plurality of liquid-contacting elements affixed to and projecting from said plate face, each of said elements including structure defining an inboard first margin adjacent said plate face;

an outboard, second margin spaced outwardly from said plate face and offset in a trailing direction from said first margin with respect to the normal direction of rotation of the plate;

an elongated first surface extending between said first and second margins and lying at an acute angle relative to the plane of said plate face, said first surface normally leading with respect to the direction of rotation of the plate; and a second, normally trailing surface extending between said second margin and said plate face and lying at an acute angle relative to the plane of said plate face, said first and second surfaces diverging with respect to each other as they extend toward said plate face, said second surface being configured to present a concave air entrapment region therein, said concave region being elongated and extending along the length of said second surface, said concave region being arcuate in cross section and having the longitudinal axis thereof intersecting said plate face.

2. The device of claim 1, said first surface also presenting a concave region, said concave region of the first surface extending laterally across the same and having the longitudinal axis thereof in general parallelism with said plate face.

3. The device of claim 1, said first margin being elongated and substantially rectilinear to present an edge.

4. The device of claim 1, said second margin being in the form of a top wall spaced outwardly from said plate face.

5. The device of claim 4, said first margin being elongated and substantially rectilinear and substantially parallel with said second margin.

6. A liquid contacting device, comprising:

a rotatable plate presenting a generally planar face; and a plurality of liquid-contacting elements affixed to and projecting from said plate face, each of said elements including structure defining an inboard first margin adjacent said plate face;

an outboard, second margin spaced outwardly from said plate face and offset in a trailing direction from said first margin with respect to the normal direction of rotation of the plate;

an elongated first surface extending between said first and second margins and lying at an acute angle relative to the plane of said plate face, said first surface normally leading with respect to the direction of rotation of the plate;

a second, normally trailing surface extending between said second margin and said plate face and lying at an acute angle relative to the plane of said plate face, said first and second surfaces diverging with respect to each other as they extend toward said plate face, said second surface being configured to present a concave air entrapment region therein; and a pair of upright, spaced apart shoulders respectively located on either side of the said second surface and extending along the length thereof.

7. The device of claim 6, including a pair of spaced, upright, flattened projections respectively located on either side of said first surface and extending along the length thereof.

8. The device of claim 7, said shoulders and projections being in substantial alignment.

9. The device of claim 6, said elements being arranged in respectively circumferentially spaced, generally radially extending rows on said plate face.

10. The device of claim 9, the elements in each row being radially offset relative to the elements in the next adjacent row thereof.

11. The device of claim 9, said elements in at least certain of said rows being integrally joined together to present an elongated, multiple-element bar-like member.

* * * * *